April 4, 1961
B. G. PRICE ET AL
2,978,637
APPARATUS FOR DETECTING DISCONTINUITIES
IN INSULATION COATINGS
Filed Nov. 14, 1957
2 Sheets-Sheet 2
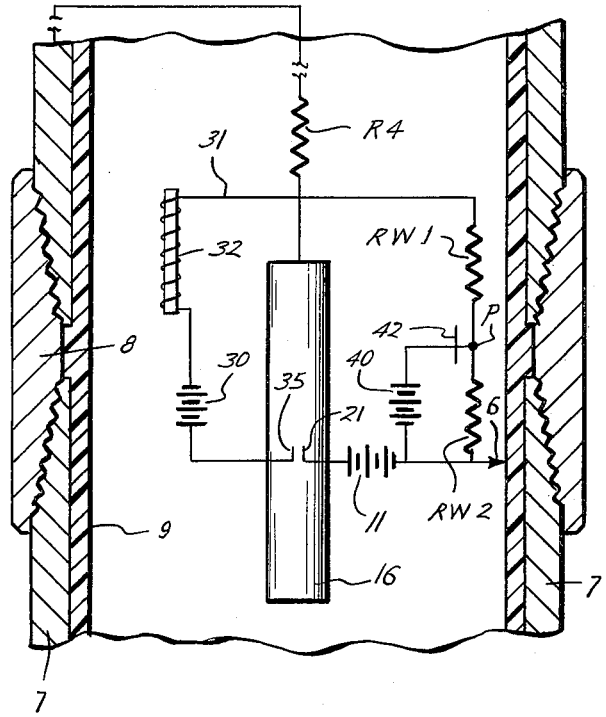
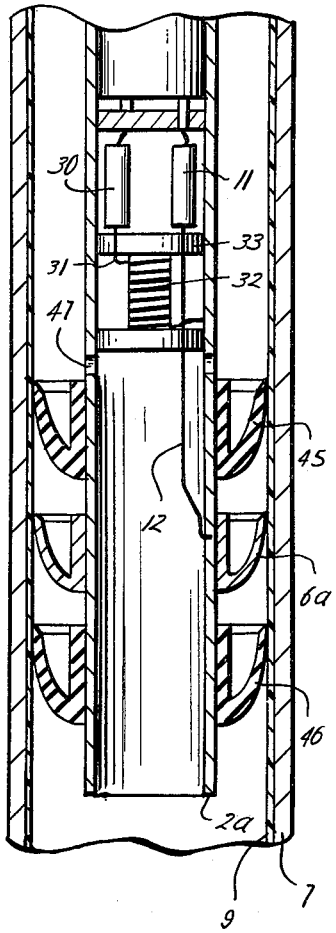
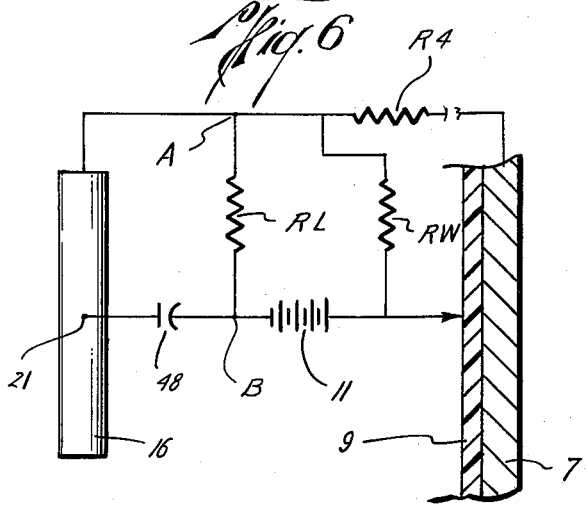
Berry G. Price
Fenton M. Wood
INVENTORS
BY Arnold and Stidham
ATTORNEYS

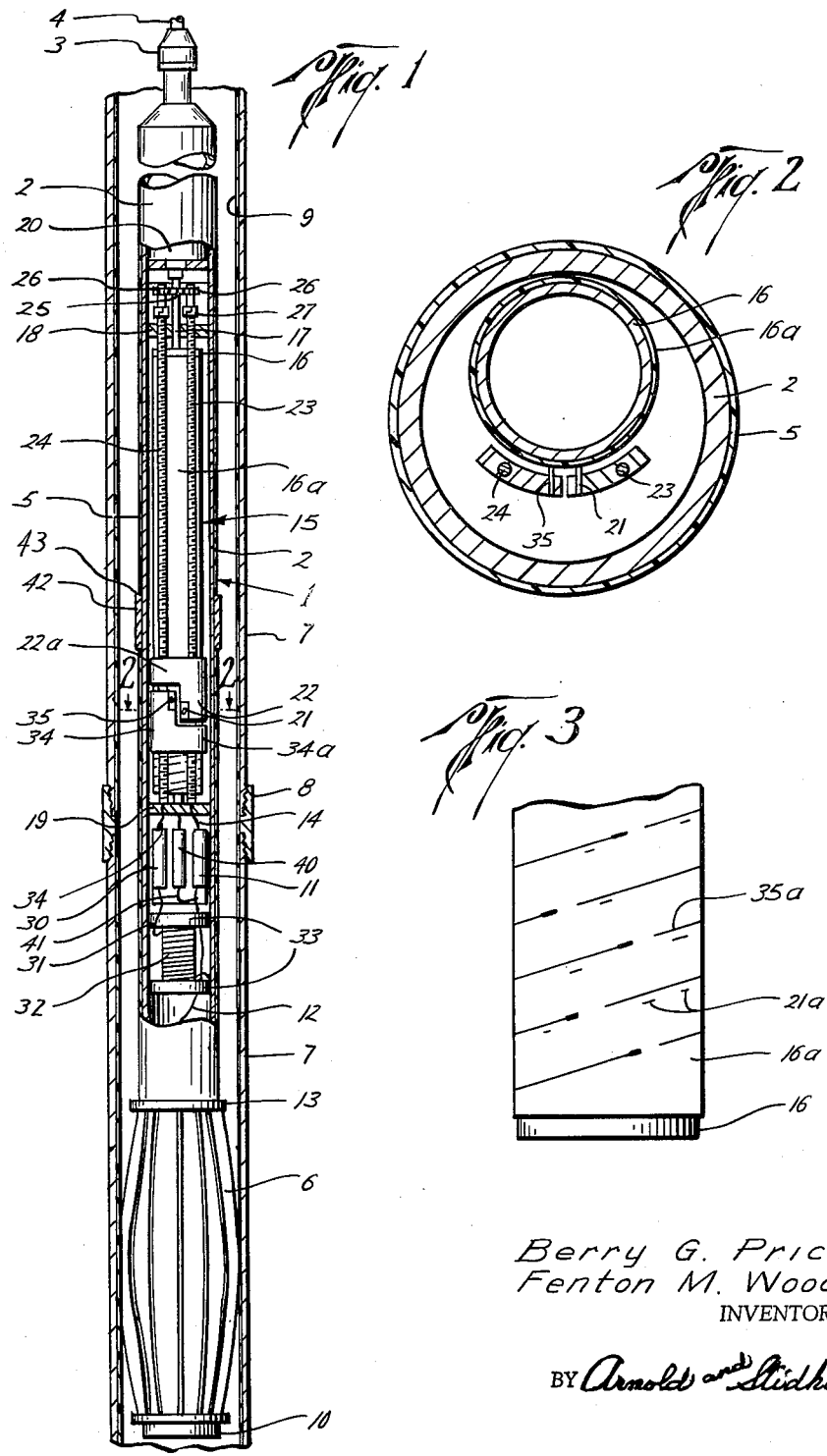

United States Patent Office 2,978,637
Patented Apr. 4, 1961

2,978,637
APPARATUS FOR DETECTING DISCONTINUITIES IN INSULATION COATINGS

Berry G. Price and Fenton M. Wood, Houston, Tex., assignors to Tuboscope Company, Harris County, Tex., a corporation of Delaware Filed Nov. 14, 1957, Ser. No. 696,560

8 Claims. (Cl. 324—54)

This invention relates to apparatus for detecting and recording the presence of breaks, holes, pits, discontinuities, etc., commonly called holidays, in coatings on the inside surface of tubing and casing and, more particularly, to electrical means for detecting and recording the presence of such holidays when the tubing is in place in a well.

It is common practice in the oil and gas industry to coat the inner surface of tubular goods that are to be placed in a producing well with a thin layer of material to protect the wall of the tubular goods from corrosion when in place in a well. Preferably, the coatings are plastics which are non-conductors of electricity. In order to be assured that the lining is performing its function it is necessary to maintain periodic checks to determine whether the lining material is homogeneous and without faults, not only before but after the tubing is placed in a well.

The usual method of testing for breaks in insulating coatings is performed above ground and involves the passing of a feeler device through the tubing by means of an electrical conductor which may be connected in series with a source of electric power, a buzzer or other signalling device, and the tubing being inspected. When a feeler encounters a holiday in the insulating coating and makes contact with the pipe itself, the circuit is completed back through the tubing causing the buzzer to sound. In that way it can be determined whether or not holidays occur in the particular length of tubing being tested.

Such devices operate with no great difficulty as long as they are used before the tubing is placed in a well. However, when the operation is attempted with tubing in place in a well at great depth, the particular length of tubing in which a holiday occurs cannot be detected. Moreover, where there is a conducting fluid, such as salt water, a spurious signal may be generated due to the flow of current from the feelers through the fluid itself to the wire line on which such instruments are ordinarily suspended. Obviously, this generation of false signals renders the conventional structure for detecting holidays above the surface virtually useless when it is used in a well.

It is, therefore, an object of this invention to provide a holiday detector that will indicate the location along the tubing axis of pits or voids in the insulation while the tubing is in place in a well.

It is a further object of this invention to provide a holiday detector that is effective even in the presence of well fluids.

It is a further object of this invention to provide a holiday detector that will detect, indicate and record the presence and vertical location of holidays in the insulation coating of tubing in place in a well.

In accordance with the foregoing objects, our invention comprises a housing that may be either lowered or raised through tubing in a well from the surface, there being a plurality of feelers on the housing connected to a source of current therein. We also provide, preferably contained within the housing itself, means for recording the signal produced when the feelers contact a holiday and means for indicating the location of collars or joints in the tubing string so that the signal indicating a holiday is recorded in conjunction with an indication enabling identification of a particular length of pipe. Additionally, as a particular feature of this invention, the holiday detector includes means for eliminating or nullifying the effect of current flow from the feelers to the recording means through a conducting medium in the well.

Other objects and advantages of our invention will become apparent from the description following when read in connection with the accompanying drawings wherein:

Fig. 1 is a section view of a preferred embodiment of the invention in operative position within oil well tubing;

Fig. 2 is a section view taken along line 2—2 of Fig. 1;

Fig. 3 is a partial plan view of record drum and chart;

Fig. 4 is a simplified wiring diagram illustrating the circuitry of the embodiment of Fig. 1;

Fig. 5 is a partial section view of another embodiment of our invention; and

Fig. 6 is a simplified wiring diagram illustrating a third embodiment of our invention.

In Fig. 1 our holiday detector 1 is shown as comprising a cylindrical housing 2 having a coupling head 3 at the upper end thereof for attachment to the end of a wire line 4 or the like. The housing 2 is non-conductive being either formed of a non-conducting material or having a non-conductive outer coating 5 thereon. On the lower end of the casing 2 are feelers 6 which extend radially outward to contact the inner surface of a tubular well casing comprising lengths of tubing 7 connected together by collars 8 and having an internal coating 9 thereon. The particular configuration of the feelers 6 is not a part of our invention and may comprise flexible wires, strips or even a complete swab cup made, for example, of electrical conductive rubber. Where wires or metal strips are used, it may be desirable to include a retracting member 10 to hold the feelers from contact with the coating 9 during descent of the instrument 1 into the hole and to release them for operative contact before ascent.

A battery 11 contained within the housing 2 is connected by a conductor 12 to a collar 13 or the like electrically connecting all of the feelers 6, and by a conductor 14 to recording means to be hereinafter described. When a feeler 6 engages a holiday, a circuit is completed from battery 11, feelers 6, the casing 7 to the top of the well and thence to the wire line 4, down to the recording means and back to the battery 11.

The recording medium should be of a type adapted to impress a visible or reproducible indicator in response to transmission of an electrical signal through the recording circuit. For example, a recording mechanism that might be employed is shown at 15. Contained within the housing 2, it includes a rotatable drum 16 carried on shaft 17, journalled in plates 18 and 19. The shaft 17 may be driven by a clock mechanism or any other means shown generally at 20. Carried on the drum 16 is a recording medium such as electro-sensitive paper 16a on which a visible mark is impressed by the passage of current therethrough. For this purpose, a stylus 21 is supported on a carrier 22 forming a part of the holiday detector circuit.

The stylus carrier 22 is threadedly engaged on one of a pair of lead screws 23 and 24 journalled in insulated bushing in the transverse bearing plates 18 and 19. The lead screws 23 and 24 are of identical pitch and are driven at the same rate by means of a gear 25 engaging pinions 26, each keyed to the lead screws 23 or 24. If desired, we may provide an arcuate extension 22a of stylus carrier 22, such extension having an insulated bushing which slidably engages the other lead screw 24 in order to ensure proper radial disposition thereof relative to the drum 16. The conductor 14 from the battery 11 is connected to lead screw 23 and the shaft 17 and drum 16 are electrically connected to the wire line by means not shown. Insulated couplings 27 are provided in the lead screws to prevent a flow of current thereto directly from the shaft 17 through the gears 26.

It will now be understood that as the housing 2 is passed through the casing 7 with the shaft 17 and lead screws 24 and 25 rotating, the stylus 21 will move axially along the drum as the drum rotates and hence, the stylus follows a helical path relative to the recording paper 16a. When a feeler engages a holiday in the pipe lining 9, the circuit will be completed through the casing 7, the wire line 4, shaft 17, drum 16, stylus 21 impressing a mark 21a on the electro-sensitive paper 16a, and thence through lead screw 23 back to the battery 11. Thus, a mark 21a (Fig. 3) indicating a holiday will appear only at intervals along the helical path.

In order to establish the location of holidays in a particular length of tubing, we provide a means for associating those isolated marks with a reference indicator enabling identification of individual pipe lengths 7. For that purpose, there is contained within the housing 2 a second battery 30 forming a part of a collar indicating circuit. A conductor 31 connected to the battery 30 is wound about a permanent magnet 32 of Alnico or the like and then connected by some means, not shown, to the drum 16. The magnet 32 is supported between two pole plates 33 of soft iron, preferably spaced apart a distance somewhat less than the length of a tubing collar 8. The other end of the battery is connected by conductor 34 to the second lead screw 24 on which is threadedly engaged a second stylus carrier 34 supporting a collar recording stylus 35. Again, an insulated extension 34a of the collar indicating stylus carrier embraces the other lead screw 23 to guide it in proper relationship to the drum 16. The styli 21 and 35 are axially offset slightly so as to distinguish the marks made by each on the electrosensitive paper as shown in Fig. 3.

The current from the battery 30 passes through the conductor to the drum 16 and then through the stylus 35 and lead screw 24 back to the battery. The current supplied by the battery 30 is just sufficient to produce a visible signal 35a on the electro-sensitive paper 16a but when sharply reduced will not mark. Thus, under normal circumstances, the stylus 35 would produce a continuous helical line adjacent to the path of stylus 21. However, a change in flux flow through the casing 7 between the magnet's pole plates 33 will induce a voltage in the coil 31 of the collar indicator circuit to affect the indications made on the electro-sensitive paper. When the magnet is opposite a collar 8, the flux flow increases sharply because it is accommodated by an area increased by the cross-section of the collar.

Thus, the line 35a impressed by stylus 35 will become heavier. Then a second change in flux flow occurs as the magnet 32 moves past the collar. Since the flow of flux is now sharply reduced by the restriction of its path to the cross-sectional area of the pipe alone, a negative voltage is induced to reduce the current normally flowing through the circuit to a value less than the critical sensitivity of the recording paper 16a. Thus, on the completed recording, a series of blank spaces will occur in the trace 35a recorded by stylus 35 to indicate the location of a collar. Since the stylus 21 is offset axially a slight amount from stylus 35, the marks indicating the occurrence of holidays can be identified and associated with a particular length of pipe by counting the blank spaces indicative of collars as shown in Fig. 3.

When the holiday detector 1 herein described is moved through a conductive fluid such as salt water, it sometimes occurs that a spurious signal is recorded on the electro-sensitive paper 16a in response to a direct flow of current between the feelers 6 and the wire line 4. To preclude the reception of these obscuring signals, we also provide within the housing 2 a third battery 40 connected by conductor 41 to the feelers 6 and by conducting means (not shown) to an electrically conductive ring 42 carried in an insulated recess 43 on the housing 2 at some point along its length intermediate the feelers 6 and the coupling 3 to which wire line 4 is attached. The battery 40 maintains the conductive ring 42 at the same potential as that of the wire line 4 when the feelers 6 are not in contact with a holiday. Consequently, no current will flow between the wire line and the conductive ring 42, and hence, the feelers 6. Any leakage current that flows through the well fluid within the casing 7 will be restricted to flow between the feelers 6 and the ring 42.

The holiday indicating and recording apparatus, illustrated in Fig. 1 is shown diagrammatically in Fig. 4 wherein battery 11 is shown connected to the feelers 6; battery 30 is connected to the coil 31 around magnet 32; and battery 40 is connected between the plate 42, diagrammatically shown as point P, and the feelers 6. The wire line is graphically indicated as a resistance R4. The well fluid between the wire line 4 and the conducting ring or plate 42 indicated by point P is illustrated as a resistance $Rw1$ and the well fluid between the conducting ring 42 and the feelers 6 is shown as a resistance $Rw2$. Since the ring or plate 42 prevents flow of current through the well fluid $Rw1$, the recording circuit is completely isolated from leakage current flow through the conducting well fluid.

It is true that the well fluid $Rw1$ and $Rw2$ shunts the stylus point 21 so that when a holiday is encountered there is a voltage divider action between the resistance R4 of the wire line and the well fluid resistance $Rw1$ and $Rw2$, the potential at the recording stylus being thereby reduced somewhat. However, this reduction is not sufficient to prevent the functioning of the stylus and a dash indicative of a holiday is recorded on the electro-sensitive paper carried on the drum 16.

In Fig. 5, we have illustrated an alternate embodiment of our invention wherein the housing 2 is similar to that shown in Fig. 1 except that only the holiday detector and collar indicator circuits are employed and no conductive ring is here provided. Again, we provide feelers 6a which may comprise flexible wires or straps as in the previous embodiment, or as illustrated, a swabbing cup of electrically conductive rubber may be employed to achieve full peripheral sensing. In addition, non-conducting swabbing cups 45 and 46 of rubber or the like are provided above and below the feelers 6a for purpose of isolating electrically the feelers from the well fluid forming an electrical path to the wire line. The lower end 2a of the housing is open and a series of ports 47 are provided above the upper swabbing cup 46 to provide a bypass for the well fluid around the feelers 6a. Thus, the path of current flow from the feelers 6a through the well fluid has been reduced to the cross-section of a thin film around the swab cup 45. With the resistance of the well fluid path so increased, the current leaking past to the wire line 4 is insufficient to affect the electrosensitive paper 16a.

A third embodiment of our invention is shown schematically in Fig. 6 wherein a load resistor RL is introduced into the holiday indicating circuit in order to produce a voltage drop between points A and B and cause leakage current due to the presence of well fluid to shunt the recording means across points A and B. Additionally, we provide a condenser 48 which characteristically offers a low impedance to sudden voltage changes, as when a holiday is sensed by the feelers 6 but a high impedance to slow voltage changes as when the instrument passes from salt water to oil.

It is apparent that many other modifications to our apparatus can be made without departing from the spirit and scope of our invention which should be limited only by the claims appended hereto.

Having described our invention, we claim:

1. A device for detecting holidays in an insulation liner in a string of pipe lengths connected by couplings within a well in the presence of well fluid comprising a non-conductive housing; a holiday detector circuit including an electrically conductive tension member supporting said housing, an electrical contact member on said housing adapted to engage said liner, an electrical connection between said pipe and said tension member at the surface of said well, and a source of voltage connected to said contact member and said tension member; a coupling detecting circuit including an induction coil responsive to movement thereof past a coupling between said pipe lengths for changing the amount of current flow; a first recording means responsive to flow of current to said holiday detector circuit to record the movement of said contact member over a holiday in said liner; and second recording means responsive to change of current intensity in said coupling detecting circuit.

2. A device for detecting holidays in an insulation liner in pipe as defined in claim 1 including means for preventing current flow from said contact member through said well fluid to said tension member comprising a conductive plate on said housing between said contact member and said tension member and a source of voltage to maintain said plate at the same potential as said tension member when said contact member is not engaging said pipe.

3. A device for detecting holidays in an insulation liner in a string of pipe lengths connected by collars within a well in the presence of well fluid comprising a non-conductive housing; a holiday detector circuit including a conductive feeler on said housing adapted to engage said liner, an electrically conductive tension member supporting said housing, an electrical connection between said pipe and said tension member at the surface of said well and a source of voltage to produce a flow of current when said feeler engages said pipe, a collar indicating circuit including voltage inducing means responsive to movement of said housing past a collar connecting adjacent pipe lengths, a moving record medium, a first recording device responsive to current flow in said holiday detector circuit for impressing a signal on said record medium; and a second recording device adjacent to said first recording device responsive to flow of induced current through said collar detector circuit for indicating on said record medium the movement of said housing past a collar.

4. A device for detecting holidays in an insulation liner in a string of pipe lengths connected together by collars within a well in the presence of well fluid comprising a non-conductive housing; a holiday detector circuit including conductive feelers carried on said housing adapted to engage said liner, a wire line supporting said housing, an electrical connection between said pipe string and said wire line at the surface of the well, and a source of voltage to produce a flow of current when at least one of said feelers engages said pipe; a closed collar-indicating circuit including a source of voltage to produce normally a current of fixed intensity and a voltage inducing means adapted to produce a change in said intensity when said housing is moved past a collar connecting adjacent pipe lengths; a moving record medium; a first recording device energized by current flow in said holiday detector circuit to impress a signal on said record medium; and a second recording device energized by current flow in said collar indicating circuit to impress a trace on said record medium adjacent to signals impressed by said first recording device, said second recording device being responsive to a change in intensity of current flow to vary the trace being impressed thereby.

5. A device for detecting holidays in an insulation liner in a string of pipe lengths within a well in the presence of well fluid comprising, a non-conductive housing, an electrically conductive tension member supporting said housing, an electrical contact member on said housing adapted to engage said liner, an electrical connection between said pipe and said tension member at the surface of said well, a source of voltage connected to said contact member and said tension member, a record medium, a recording member associated with said record medium responsive to current flow for indicating on said record medium the presence of a holiday in said liner, means for indicating simultaneously on said record medium increments of movement of said housing through said string of pipe, and means for substantially preventing current flow through said well fluid between said feelers and said tension member comprising a conductive member on said housing intermediate said contact member and said tension member and a second source of voltage connected to said conducting member to hold said conductive member at the same potential as said tension member when said contact member is not in contact with said pipe.

6. A device for detecting holidays in an insulation liner in pipe as defined in claim 4, including means for preventing current flow through said well fluid between said feelers and said wire line,
such current flow preventing means comprising
    an electrically conductive plate on said housing between said feelers and said wire line and
    a source of voltage to maintain said plate at substantially the same potential as that of the wire line when said feelers are not in contact with said pipe.

7. A device for detecting holidays in an insulation liner in a string of pipe lengths connected together by collars within a well comprising a housing having a non-conductive external surface;
a holiday detector circuit including
    conductive means carried on said housing adapted to engage said liner,
    a wire line supporting said housing,
    an electrical connection between said pipe string and said wire line at the top of the well,
    and a source of voltage to produce a flow of current when said means engages said pipe;
a closed collar-indicating circuit including
    a source of voltage to produce a current in said collar-indicating circuit and
    a voltage inducing means adapted to produce a change in said current when said housing is moved past a collar connecting adjacent pipe lengths;
a record medium adapted to move relative to the below identified recording devices;
a first recording device energized by current flow in said holiday detector circuit to impress a signal on said record medium;

and a second recording device responsive to current flow in said collar indicating circuit to impress a trace on said record medium adjacent to signals impressed by said first recording device.

8. A device for detecting in the presence of well fluid holidays in an insulation liner in pipe as defined in claim 7, including means for preventing current flow through said well fluid between said conductive means and said wire line, such current flow preventing means comprising an electrically conductive plate on said housing between said feelers and said wire line and a source of voltage to maintain said plate at substantially the same potential as that of the wire line when said conductive means is not in contact with a holiday.

References Cited in the file of this patent
UNITED STATES PATENTS

| | | |
|---|---|---|
| 2,554,844 | Swift | May 29, 1951 |
| 2,564,861 | Sherborne | Aug. 21, 1951 |
| 2,580,457 | Norris | Jan. 1, 1952 |
| 2,602,833 | Swift | July 8, 1952 |
| 2,729,784 | Fearon | Jan. 3, 1956 |
| 2,891,215 | Fearon | June 16, 1959 |